Dec. 3, 1963   F. W. BLANCHARD   3,112,883
GENERAL PURPOSE VARIABLE PATTERN HOSE NOZZLE
Filed June 8, 1962   2 Sheets-Sheet 1
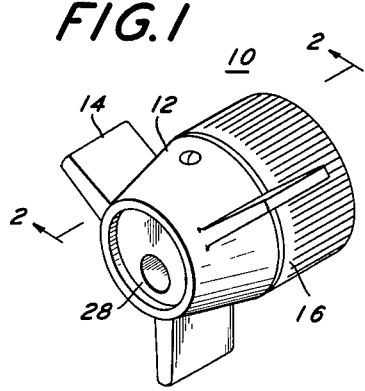
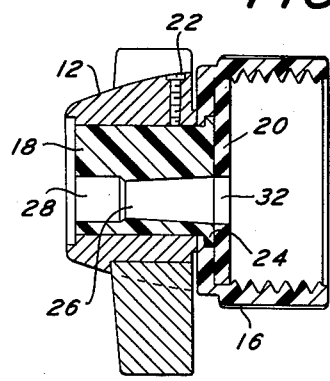
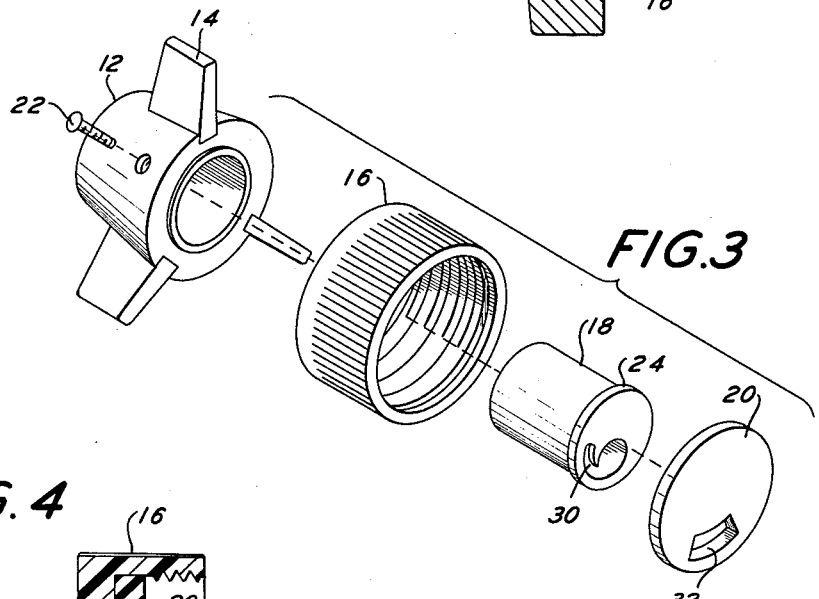
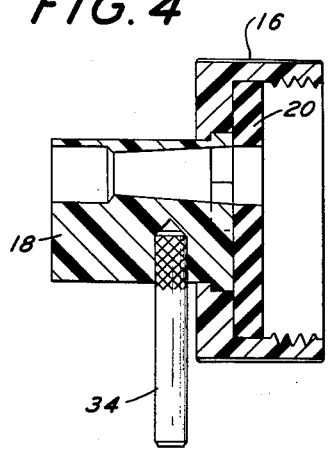
INVENTOR.
FLOYD W. BLANCHARD
BY
Arthur H. Seidel
ATTORNEY

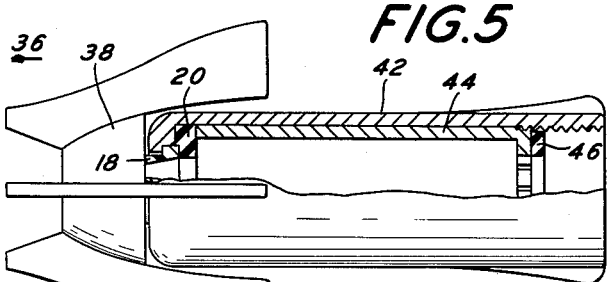
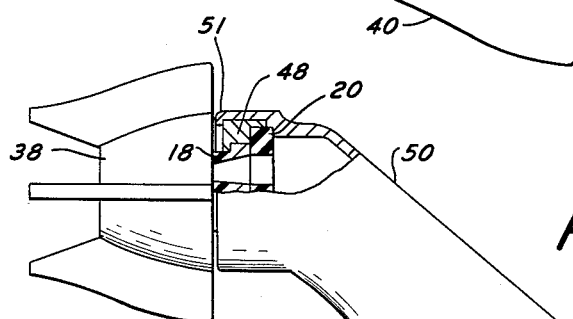
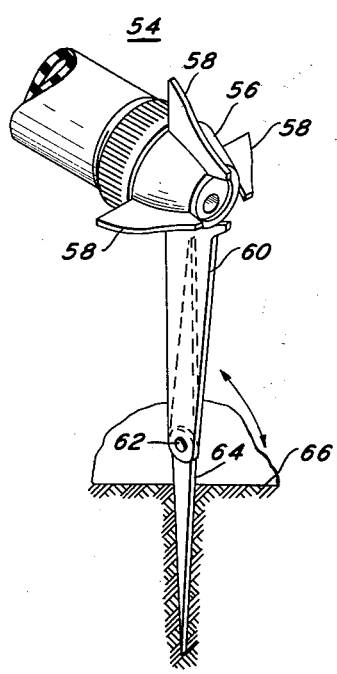
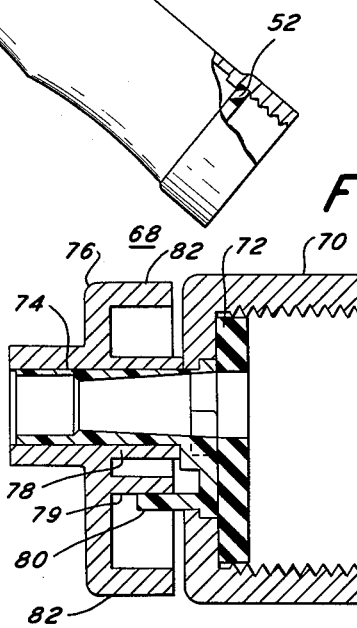

United States Patent Office 3,112,883
Patented Dec. 3, 1963

3,112,883
GENERAL PURPOSE VARIABLE PATTERN HOSE NOZZLE
Floyd W. Blanchard, Los Angeles, Calif., assignor to HMS Associates Co., Willow Grove, Pa., a corporation of Pennsylvania
Filed June 8, 1962, Ser. No. 201,160
9 Claims. (Cl. 239—276)

In general, this invention relates to a new and improved hose nozzle. More particularly, it relates to a hose nozzle capable of providing a multitude of spray patterns.

The nozzle of the present invention is adapted to provide four different patterns of flow therefrom utilizing a simple adjustment of the nozzle. The nozzle is capable of providing a hard solid jet, a raindrop pattern, a fine spray, or a wide cone fine spray. The nozzle achieves these variations in flow pattern through the use of a simple interrelationship between an eccentric opening in a gasket and an eccentric passage through the nozzle. By providing a nozzle passage with a spoiler tube at one end thereof and a spin channel adjacent the other end abutting the gasket, the patterns mentioned above may be obtained. Of course, the nozzle is also adapted to prevent the flow of liquid therefrom when the opening in the gasket is out of alignment with the passage through the nozzle.

It is the general object of this invention to provide a new and improved general purpose nozzle.

It is another object to provide a new and improved nozzle capable of causing a multitude of flow patterns.

It is still another object of this invention to provide a simple nozzle assembly structure which can be easily manufactured.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of one embodiment of the present invention.

FIGURE 2 is a cross-sectional view of the embodiment shown in FIGURE 1 taken along lines 2—2.

FIGURE 3 is an exploded view of the nozzle assembly shown in FIGURE 1.

FIGURE 4 is a cross-sectional view of a second embodiment of the present invention.

FIGURE 5 is a third embodiment of the present invention.

FIGURE 6 is another embodiment of the present invention utilizing a pistol grip.

FIGURE 7 is a perspective view of a spike sprinkler utilizing a nozzle of the type shown in FIGURE 1.

FIGURE 8 is a cross-sectional view of still another embodiment of the present invention.

Referring to the drawings in detail, there is shown in FIGURE 1 a nozzle assembly built in accordance with the principles of the present invention and generally designated by the numeral 10. The nozzle assembly 10 consists of an adjusting ring 12 having integral extending tabs 14 adapted to aid in rotative movement of the adjusting ring 12. Adjacent the adjusting ring 12 is an annular main body member 16 which is internally threaded. The other parts of the nozzle assembly 10 are a nozzle 18, gasket 20, and a setscrew 22.

The nozzle 18 has an outwardly extending annular flange 24. This flange 24 is adapted to register with an annular front wall on the main body 16 so as to seat the nozzle 18 in aligned relationship with an opening in the adjusting ring 12. The internal diameter of the adjusting ring 12 exactly coincides with the diameter of the nozzle 18. When the nozzle assembly is put together, the nozzle 18 is fitted so that its flange 24 abuts the annular front wall on the main body 16 and slides into position in the adjusting ring 12. The setscrew 22 passes through a hole in the outer wall of the adjusting ring 12 so as to secure the nozzle 18 to the adjusting ring 12.

The nozzle 18 has a passageway therethrough. The passageway consists of a spoiler tube 28 at one end of the nozzle and an orifice tube 26 axially aligned with the spoiler tube 28 at the other end of the nozzle. The orifice tube 26 is tapered so that its larger diameter is at one face of the nozzle 18 and its smaller diameter is adjacent the spoiler tube. The diameter of the spoiler tube is greater than that of the smaller end of the orifice tube 26.

The end of the orifice 28 is adjacent the flanged wall of the nozzle 18. A spin channel 30 is also positioned in the flanged end wall of the nozzle 18. The spin channel 30 is shaped like the involute of a circle and communicates with the open end of the orifice tube 26 so as to supply fluid peripherally to the orifice tube 26.

The gasket 20 has an eccentric opening 32 therethrough. The gasket 20 is adapted to be press-fit against the flanged wall of the nozzle 18 and against the front annular flange of the main body 16. This press-fit is water-tight so that no fluid will pass around the gasket 20.

The nozzle shown in FIGURES 1–3 is capable of five different types of operation. If the orifice tube 26 is fully aligned with the opening 32, a hard solid jet of fluid will flow through the nozzle 18. This is so because full alignment of the opening 32 and the orifice tube 26 permits laminar flow of fluid therethrough. If there is slight misalignment between the opening 32 and the orifice tube 26 a raindrop pattern will result. This raindrop pattern will be caused by the disturbance in the laminar flow due to the misalignment, and will be aided by the action of the spoiler tube 28 and the vibration of the gasket 20 due to the misalignment.

A fine spray pattern may be achieved by moving the opening 32 to a position whereby the orifice tube 26 is almost closed. This almost closed position is on the side opposite the spin channel 30. To achieve a wide cone fine spray, the opening 32 is moved to a position whereby it is completely misaligned with the orifice tube 26 but is still partially aligned with the spin channel 30. Thus, any fluid passing through the opening 32 will enter the spin channel 30 and will be driven peripherally around the orifice tube 26 causing a wide cone spray.

Of course, if the opening 32 is not in alignment with either the orifice tube 26 or the spin channel 30, there will be no flow from the nozzle assembly.

In FIGURE 4 there is shown another method of moving the nozzle 18. The annular adjusting ring 12 has been eliminated and a control lever 34 extends in bore 33 in the nozzle 18. The nozzle 18 shown in FIGURE 4 may be made of a powdered metal, whereas the nozzle 18 shown in FIGURES 1–3 was preferably made of a thermoplastic resin.

In FIGURE 5 there is shown another embodiment of the present invention, generally designated by the numeral 36.

The nozzle assembly 36 consists of an adjusting ring 38 having four tabs 40 integral and extending outwardly therefrom. The adjusting wings 40 may be made as large as styling permits. Although four such wings have been shown, it will be readily understood that six, eight or any number of wings 40 may be utilized within the scope of this invention.

The nozzle assembly 36 has a main body 42 with an annular inwardly extending front wall section. The front wall section of the body 42 cooperates with the nozzle 18 in the same manner as was discussed with respect to FIGURE 2. The flange 24 of nozzle 18 projects a small distance beyond the front wall section of the body 42. The gasket 20 cooperates with the nozzle 18 and the annular inwardly extending flange of the main body 42 so that the gasket 20 is indented around the flange 24 to form a better watertight seal. A liner 44 is placed within the main body 42. The main body 42 has internal screw threads at the end opposite from the nozzle. Screw threads on the outer wall of the liner 44 cooperate with the screw threads on the internal wall of the main body 42. The liner 44 is rotatably secured within the main body 42 and forced forward so as to create a watertight seal between the gasket 20 and the main body 42. A washer 46 is placed at the other end of the liner 44 so as to create a watertight seal between the main body 42 and the connection to a source of fluid (not shown).

In FIGURE 6 there is shown a nozzle utilizing the principles of the present invention with a pistol grip type main body. The main body 50 shown in FIGURE 6 has a pistol grip type structure and is adapted to be secured to the nozzle 18 and gasket 20 through a washer member 48. The washer member 48 has a lip which extends over the flange 24 of the nozzle 18 and against the gasket 20. The edges 51 of the main body 50 are crimped over the washer 48 to seat the gasket tightly for a watertight seal. The other end of the pistol grip main body 50 is internally screw threaded and has a washer 52 therein for providing a watertight seal between the main body 50 and its connector. It can readily be seen that other means for securing or forcing the washer 48 to seat securely might be utilized by one skilled in the art.

In FIGURE 7 there is shown a spike sprinkler utilized with a nozzle such as is shown in FIGURE 1. The nozzle assembly 54 shown in FIGURE 7 is similar to that shown in FIGURE 1 with the exception that the adjusting ring 12 of FIGURE 1 is removed and an adjusting ring 56 is provided. The adjusting ring 56 has outwardly extending wings 58 spaced ninety degrees apart on three portions thereof. At a fourth point along the periphery of the adjusting ring 56 there is an outwardly extending portion 60 having a pivot 62 at its outer end. Pivotally connected to the extension 60 is a spike 64 adapted to be placed in the earth 66. If it is desired to remove the spike 64 from the ground, it may be folded as shown in phantom so as to prevent any injury therefrom.

In FIGURE 8 there is shown another embodiment of the present invention in which the adjusting ring of the nozzle and the nozzle itself are molded parts.

The nozzle assembly 68 shown in FIGURE 8 includes a main body 70, a washer 72, nozzle 74, and adjusting ring 76. The adjusting ring 76 has an annular tubular flange 78 extending outwardly therefrom so as to provide a suitable housing for the nozzle 74. A second tubular annular flange 79 is provided eccentric to the flange 78. The tubular flange 79 cooperates with a suitable inwardly extending flange 80 coextensive with the inner diameter of the front opening in the nozzle 74. Fingers 82 extend outwardly from the body of the adjusting ring 76 and are adapted to be utilized in rotating the adjusting ring 76. The nozzle 74 and the adjusting ring 76 are press-fitted together so that they move as one piece. The cooperation between the annular flanges 79 and 80 is spring-like so that they force one against the other. This allows the nozzle 74 to rotate relative to the gasket 72.

The present invention may be embodied in other specific forms without departing from the spirit or essential attributes thereof and, accordingly, reference should be made to the appended claims, rather than to the foregoing specification as indicating the scope of the invention.

I claim:

1. A nozzle assembly comprising a nozzle having an eccentric axial bore therethrough, a main body rotatably secured to said nozzle and having a radially inwardly directed portion, a gasket axially aligned with said nozzle and supported by said main body juxtaposed to said main body portion, said gasket having an eccentric hole therethrough adapted to be fully aligned with said bore in at least one rotative position of said nozzle relative to said gasket, a tubular liner, said main body being tubular and having an inner diameter substantially equal to the outer diameter of said tubular liner, said liner being disposed within said main body and in contact with a portion of said gasket, said liner being adapted to force said gasket into watertight sealing engagement with said portion of said body thereby assisting any water pressure exerted on said gasket to effect such watertight sealing arrangement.

2. A nozzle assembly comprising a nozzle having an eccentric bore therethrough, a main body rotatably secured to said nozzle, a gasket axially aligned with said nozzle and supported by said main body, said gasket having an eccentric hole therethrough adapted to be fully aligned with said bore in at least one position of said nozzle relative to said gasket, said bore being partially defined by an orifice tube tapering from a larger diameter at one end to a smaller diameter at the other end thereof, said bore being partially defined by a spoiler tube of constant diameter greater than the diameter of said orifice tube at the smaller end of said orifice tube, one end of said spoiler tube being in direct communication with the other end of said orifice tube, the larger diameter end of said orifice tube being in direct communication with the gasket hole, and the transverse dimension of said gasket hole corresponding to the transverse dimension of said larger diameter end of said orifice tube as measured along a radial line perpendicular to the longitudinal axis of said main body.

3. The nozzle assembly of claim 2 wherein a spinner channel is provided at said larger diameter end of said orifice tube for effecting a peripheral flow pattern of liquid flowing through said orifice tube.

4. The nozzle assembly of claim 3 including an adjusting ring fixedly secured to said nozzle, said adjusting ring having an extension therefrom, the end of said extension being pivotally secured to a spike whose length is less than the length of said extension.

5. The nozzle assembly of claim 2 wherein said nozzle has a second bore therein perpendicular to the axis of said nozzle, said second bore being out of communication with said first mentioned bore, and a control lever fixedly secured within said second bore to facilitate rotation of said nozzle.

6. The nozzle assembly of claim 3 wherein said spinner channel comprises an arcuate port extending tangentially from the larger diameter end of said orifice tube.

7. The nozzle assembly of claim 2 including an annular ring removably secured to and selectively rotatable with respect to said nozzle, an extension integral with and extending from a portion of said ring assembly, said extension including a spike whereby said nozzle may be placed in the earth.

8. A nozzle assembly comprising a nozzle having an eccentric axial bore therethrough, a main body rotatably secured to said nozzle, a gasket axially aligned with said nozzle and supported by said main body, said gasket having an eccentric hole therethrough adapted to be fully aligned with said bore in at least one rotative position of said nozzle relative to said gasket, an annular washer around a portion of said nozzle and said gasket, one end of said main body surrounding said washer, and a radially inwardly directed flange on an end of said body for retaining said washer in abutting contact with a portion of said main body to effect a watertight seal between said main body and said washer.

9. A nozzle assembly comprising a nozzle having an eccentric axial bore therethrough, a main body rotatably secured to said nozzle, a gasket axially aligned with said nozzle and supported by said main body, said gasket having an eccentrically located hole therethrough, said hole adapted to be fully aligned with said bore in at least one position of said nozzle relative to said gasket, said bore having one end juxtaposed to said gasket, said gasket hole being arcuately shaped, and said nozzle having an arcuate spinner channel tangentially communicating with said one end of said bore.

References Cited in the file of this patent

UNITED STATES PATENTS

| | | |
|---|---|---|
| 246,673 | Hall | Sept. 6, 1881 |
| 1,873,622 | Moran | Aug. 23, 1932 |
| 2,132,333 | Wendell et al. | Oct. 4, 1938 |
| 2,536,361 | Flanders | Jan. 2, 1951 |
| 2,595,737 | Rotz | May 6, 1952 |
| 2,657,098 | Strahman | Oct. 27, 1953 |
| 2,761,734 | Farmer | Sept. 4, 1956 |
| 2,868,512 | Sease | Jan. 13, 1959 |
| 2,989,250 | Simon | June 20, 1961 |

FOREIGN PATENTS

| | | |
|---|---|---|
| 36,882 | Switzerland | Apr. 6, 1906 |
| 532,238 | Great Britain | Jan. 21, 1941 |